UNITED STATES PATENT OFFICE.

SAMUEL EDEN, OF NEW YORK, N. Y.

DISINFECTING-BLOCK.

SPECIFICATION forming part of Letters Patent No. 653,989, dated July 17, 1900.

Application filed January 15, 1900. Serial No. 1,459. (No specimens.)

*To all whom it may concern:*

Be it known that I, SAMUEL EDEN, a citizen of the United States, and a resident of the city of New York, borough of Brooklyn, county of Kings, and State of New York, have invented a new and Improved Disinfectant, of which the following is a full, clear, and exact description.

The object of the invention is to provide a new and improved disinfectant, more especially designed for use in sinks, basins, bathtubs, and the like, and arranged to prevent obnoxious gases from passing into a room, the disinfectant serving to produce a healthful, invigorating atmosphere in the room, to minimize the danger of infection by means of contamination, and to prevent the spreading of contagious diseases to which one may have been exposed.

The invention consists of a composition of matter adapted to be made in disk form, which is readily and removably placed in position over the outlet or other part of a sink and through which part foul gases are liable to pass into a room, the composition having the following ingredients in about the proportion stated, namely: bichloride of mercury, forty grains; disinfecting-oils, one hundred and eighty drops; talcum, one ounce; Portland cement, seven ounces. As a disinfecting-oil I prefer to use eucalyptus, sixty drops; thyme, sixty drops; cinnamon, sixty drops.

The ingredients are thoroughly mixed and a sufficient quantity of water is added to form a plastic mass which can be readily poured into a mold, in which it is left to dry and to harden, the mold being preferably shaped to give a disk form to the article.

The disinfecting-disk prepared in the manner described is preferably provided with a chain adapted to be fastened to a sink or adjacent part to allow of conveniently placing the disk in position over the outlet of the sink and to allow of removing it from the sink when it is not desired to use the disinfectant in the sink. The obnoxious odors and gases arising in the sink and coming in contact with the disinfecting-disk are deprived of their dangerous matter and the surrounding air in the room is thoroughly disinfected and rendered sweet and healthful, and all danger of infection from contaminated food is greatly minimized.

The disinfectant can be cheaply manufactured, readily applied and removed when necessary, and its nature is such that the several ingredients are combined to render the disinfectant available and powerful for a long time.

Having thus fully described my invention, I claim as new and desire to secure by Letters Patent—

1. As a new article of manufacture, a disinfectant in solid form and composed of bichloride of mercury, disinfecting-oils, talcum and Portland cement, in about the proportions specified.

2. As a new article of manufacture, a disinfectant in solid form, and composed of bichloride of mercury, eucalyptus, thyme, cinnamon, talcum and cement, in about the proportions specified.

In testimony whereof I have signed my name to this specification in the presence of two subscribing witnesses.

SAMUEL EDEN.

Witnesses:
SINCLAIR W. DE MILT,
ELLA A. COOPER.